F. J. BROWN.
NUT LOCK.
APPLICATION FILED MAR. 23, 1909.
930,148.
Patented Aug. 3, 1909.
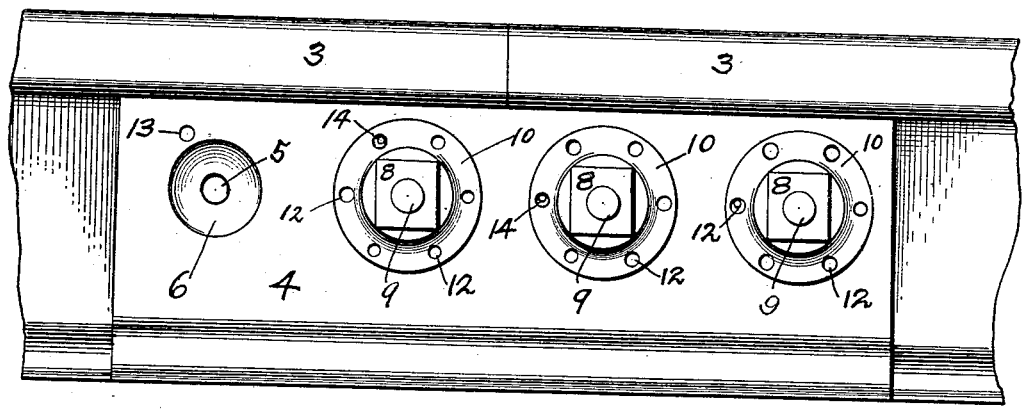
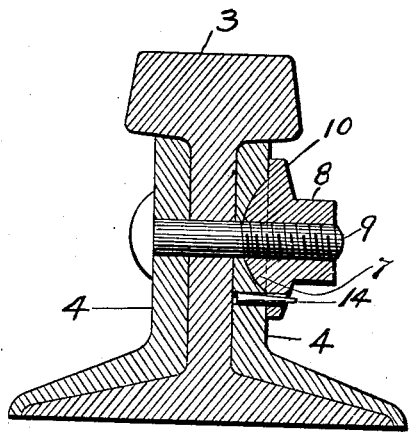

UNITED STATES PATENT OFFICE.

FREDERICK J. BROWN, OF SCRANTON, PENNSYLVANIA, ASSIGNOR OF ONE-HALF TO JOHN J. SCOTT, OF SCRANTON, PENNSYLVANIA.

NUT-LOCK.

No. 930,148.     Specification of Letters Patent.     Patented Aug. 3, 1909.

Application filed March 23, 1909. Serial No. 485,199.

*To all whom it may concern:*

Be it known that I, FREDERICK J. BROWN, a citizen of the United States, residing at Scranton, in the county of Lackawanna and State of Pennsylvania, have invented certain new and useful Improvements in Nut-Locks; and I do hereby declare the following to be a full, clear, and exact description of the invention, such as will enable others skilled in the art to which it appertains to make and use the same.

My invention relates to nut locks, and has for an object to provide an improved nut with a flanged base and means therein for locking the nut upon the nut seat.

A further object of the invention is to provide a nut with a projecting base, to register in a cavity, for the purpose of relieving the shearing strains on the bolt when the nut is struck by the flange of a car wheel or other moving objects.

With these and other objects in view the invention comprises certain novel constructions, combinations and arrangements of parts as will be hereinafter more fully described and claimed.

In the accompanying drawings, Figure 1 represents a side elevation of a rail joint with my improved nut lock applied thereto. Fig. 2 represents a transverse section in elevation of the rail joint, taken through one of the improved nut locks.

In the application of my improved nut lock, I have shown it in connection with the angle plate of a rail joint, but I wish it understood that this form of nut lock may be used to equal advantage on other devices.

Referring to the drawings by numerals, 3 represents the ends of an ordinary track rail on each side of which is secured an angle plate 4, which spans the joint where the two rails 3 come together. Through each of the angle plates 4 is provided a bolt hole 5 concentric with a concavity 6 constructed for the purpose of receiving the convex or spherical portion 7 of the nut 8. The bolt 9 is passed through the angle plates 4 and through the rail section 3, and on the end of the bolt is screwed the lock nut 8, until the convex or spherical portion 7 has entirely contacted with the wall of the concavity 6. The nut 8 is also provided with a flanged portion 10, through which a series of holes 12 are located equi-distant from the center of the nut 8. Through the flanged plates 4 a hole 13 is provided for the purpose of receiving the base end of a tapering pin 14, after the pin has been inserted into one of the holes 12 in the flange 10 of the nut 8.

In applying my improved nut lock, the bolt 9 is passed through the angle plates 4 and the rail section 3, and the nut 8 is then turned upon the threaded portion of the bolt 9 until the convex portion 7 becomes frictionally engaged with the wall of the concavity 6, and the flange portion 10 engages the material of the angle plate 4 surrounding the concavity 6. The nut 8 is then adjusted until one of the holes 12 in the flange 10 has registered with the hole 13 in the angle plate 4. When this is done the tapering pin 14 is inserted in one of the holes 12 of the flange 10, and through the flange 10 into the hole 13, the base of the pin being entered first, which portion becomes seated on the web of the rail section 3. In this position the small end of the pin 14 projects into the hole 12 in the nut flange 10, but does not fill the same. The nut is then partly unscrewed until the hole 13 in the angle plate 4 no longer registers with the hole 12 in the nut flange 10. With the nut in this position the material of the flange 10 surrounding the hole 12 engages the outer and smaller portion of the pin 14, and prevents the pin from being withdrawn. At this juncture, the pin outlet, through the nut flange, is reduced to a less diameter than that portion of the pin that projects into the hole 13. The nut is thus prevented from unscrewing, as the pin 14 acts as a stop for the same. Before the pin can be removed, the nut 8 will have to be tightened until the hole 12 in the flange 10 registers with the hole 13 in the flanged section 4. It will therefore be seen that the nut is securely locked, and that there is no possible way of its becoming loosened, when once screwed into position, until it has been tightened sufficiently to make the holes 12 and 13 register, at which position the pin 14 can be removed and the nut unscrewed in the usual way.

The purpose of the concavity 6 is to allow the convex or spherical portion 7 of the nut 8 to project therein, for the purpose of relieving a part of the shearing strains that may come upon the bolt 9 from time to time.

What I claim is:

1. In a nut lock, the combination of a bolt, a flanged nut having apertures formed therethrough, a friction plate having an aperture formed therein, one of the first-mentioned apertures registering with the second mentioned aperture, a tapering pin positioned within the said apertures, a projection upon said flanged nut, a cavity formed within said friction plate, the said cavity receiving the said projection upon said nut.

2. In a nut lock, the combination of a bolt, a friction plate formed with an aperture therein, a flanged nut formed with apertures therethrough, the first mentioned aperture registering with one of the second mentioned apertures, a tapering pin having its larger end inserted into the first mentioned aperture, and its smaller end loosely projecting into the second mentioned aperture.

3. In a nut lock, the combination of a bolt, a friction plate formed with an aperture therein, a flanged nut formed with apertures therethrough, the first mentioned aperture registering with one of the second mentioned apertures, a tapering pin having its larger end inserted into the first-mentioned aperture and its smaller end loosely projecting into the second mentioned aperture, and the said flanged nut adapted to be slightly unscrewed to engage the outer portion of the said pin and to lock the said pin against outward movement.

In testimony whereof I affix my signature in presence of two witnesses.

FREDERICK J. BROWN.

Witnesses:
  W. W. BAYLOR,
  MORTIMER MACVITTER.